United States Patent
Beardsley et al.

(10) Patent No.: US 6,327,644 B1
(45) Date of Patent: Dec. 4, 2001

(54) METHOD AND SYSTEM FOR MANAGING DATA IN CACHE

(75) Inventors: Brent Cameron Beardsley; Michael Thomas Benhase; Douglas A. Martin; Robert Louis Morton; Mark A. Reid, all of Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/135,842

(22) Filed: Aug. 18, 1998

(51) Int. Cl.[7] .................................................. G06F 12/08
(52) U.S. Cl. ........................ 711/136; 711/133; 711/113
(58) Field of Search ................................... 711/133, 136, 711/159, 160, 113

(56) References Cited

U.S. PATENT DOCUMENTS

| | | | |
|---|---|---|---|
| 4,437,155 | 3/1984 | Sawyer et al. | 711/136 |
| 4,458,316 | 7/1984 | Fry et al. | 710/52 |
| 4,463,424 | * 7/1984 | Mattson et al. | 711/136 |

(List continued on next page.)

FOREIGN PATENT DOCUMENTS

| | | |
|---|---|---|
| 0674263 | 2/1995 | (EP). |
| 6052060 | 2/1994 | (JP). |

OTHER PUBLICATIONS

Improving Most Recently User Change Prefetching, IBM Technical Disclosure Bulletin, vol. 36, No. 08, Aug. 1993.
Optimized Look–Ahead Extension on Sequential Access, IBM Technical Disclosure Bulletin, vol. 39, No. 11, Nov. 1996.
Direct Access Storage Device Cache Segment Management, IBM Technical Disclosure Bulletin, vol. 37, No. 08, Aug. 1994.
Cache System for Hard Disk System Utilizing the Access Data Address, IBM Technical Disclosure Bulletin, vol. 38, No. 01, Jan. 1995.
Direct Memory Access Paging and Remote DRAM Access Through an Optimized Memory Mapping Mechanism, IBM Technical Disclosure Bulletin, vol. 38, No. 06, Jun. 1995.
Non–Volatile Cache Storage Allocation Algorithm, IBM Technical Disclosure Bulletin, vol. 38, No. 12, Dec. 1995.
Fixed Storage Allocation of Input–Output Buffers, IBM Technical Disclosure Bulletin, vol. 39, No. 03, Mar. 1996.
Remote Copy Administrator's Guide and Reference, DFSMS/MVS Version 1, Third Edition, Jul. 1996 IBM Doc. No. SC35–0169–02.
Pinter and Yoaz; Tango: a Hardware–based Data Prefetching Technique for Superscalar Processors; Proceedings of the $29^{th}$ Annual IEEE/ACM International Symposium on Microarchitecture MICRO–29, Dec. 2–4, 1996, Paris France.

(List continued on next page.)

Primary Examiner—Reginald G. Bragdon
(74) Attorney, Agent, or Firm—David W. Victor; Konrad Raynes & Victor

(57) ABSTRACT

Disclosed is a system for managing data in cache. A list of data entries in a first memory area has a first end and a second end, such as a most recently used (MRU) end and least recently used (LRU) end. A first pointer addresses a data entry in the list and a second pointer addresses another data entry in the list that is not at the first and second ends. Data from a second memory area is provided to add to the list. A determination is made as to whether the provided data to add to the list is one of a first type and second type of data, such as sequentially accessed data or non-sequentially accessed data. The provided data is stored in the first memory area as a new data entry in the list. The first pointer is modified to address the new data entry after determining that the provided data is of the first type. After determining that the provided data is of the second type, the second pointer is processed to determine where to add the new data entry to the list between the first and second ends.

14 Claims, 6 Drawing Sheets

U.S. PATENT DOCUMENTS

| | | | |
|---|---|---|---|
| 4,468,730 | 8/1984 | Dodd et al. | 711/113 |
| 4,489,378 | 12/1984 | Dixon et al. | 710/33 |
| 4,490,782 | 12/1984 | Dixon et al. | 711/136 |
| 4,533,995 | 8/1985 | Christian et al. | 711/122 |
| 4,583,166 | 4/1986 | Hartung et al. | 711/113 |
| 4,603,382 | 7/1986 | Cole et al. | 710/56 |
| 4,636,946 | 1/1987 | Hartung et al. | 711/136 |
| 4,875,155 | 10/1989 | Iskiyan et al. | 711/113 |
| 4,882,642 | 11/1989 | Tayler et al. | 360/78.11 |
| 4,956,803 | 9/1990 | Tayler et al. | 711/113 |
| 4,979,108 | 12/1990 | Crabbe, Jr. | 709/106 |
| 5,043,885 * | 8/1991 | Robinson | 711/133 |
| 5,134,563 | 7/1992 | Tayler et al. | 711/143 |
| 5,263,145 | 11/1993 | Brady et al. | 711/114 |
| 5,293,609 * | 3/1994 | Shih et al. | 711/137 |
| 5,297,265 | 3/1994 | Frank et al. | 711/202 |
| 5,426,761 | 6/1995 | Cord et al. | 711/114 |
| 5,432,919 | 7/1995 | Falcone et al. | 711/134 |
| 5,432,932 | 7/1995 | Chen et al. | 709/103 |
| 5,434,992 | 7/1995 | Mattson | 711/119 |
| 5,440,686 | 8/1995 | Dahman et al. | 345/511 |
| 5,440,727 | 8/1995 | Bhide et al. | 711/117 |
| 5,446,871 | 8/1995 | Shomler et al. | 714/1 |
| 5,481,691 | 1/1996 | Day, III et al. | 711/133 |
| 5,504,861 | 4/1996 | Crockett et al. | 714/13 |
| 5,526,511 * | 6/1996 | Swenson et al. | 711/134 |
| 5,551,003 | 8/1996 | Mattson et al. | 711/136 |
| 5,574,950 | 11/1996 | Hathorn et al. | 710/8 |
| 5,590,308 | 12/1996 | Shih | 711/136 |
| 5,592,618 | 1/1997 | Micka et al. | 714/54 |
| 5,606,688 | 2/1997 | McNutt et al. | 711/170 |
| 5,615,329 | 3/1997 | Kern et al. | 714/6 |
| 5,623,599 | 4/1997 | Shomler | 714/8 |
| 5,623,608 | 4/1997 | Ng | 711/137 |
| 5,627,990 | 5/1997 | Cord et al. | 711/122 |
| 5,636,359 | 6/1997 | Beardsley et al. | 711/122 |
| 5,651,136 | 7/1997 | Denton et al. | 711/118 |
| 6,049,850 * | 4/2000 | Vishlitzky et al. | 711/136 |

OTHER PUBLICATIONS

Patterson, et al.; Informed Prefetching and Caching; Proceedings of the 15$^{th}$ ACM Symposium on Operating Systems Principles, Dec. 3–6, 1995, Copper Mountain Resort, Colorado.

Tomkins et al; Informed Multi Process Prefetching and Caching; Performance Evaluation Review Special Issue, vol. 25, No. 1, Jun. 1997—1997 ACM Sigmetrics Interantional Conference on Measurement and Modeling of Computer Systems.

Patterson and Gibson; Exposing I/O Concurrency with Informed Prefetching; Proceedings of the Third International Conference on Parallel and Distributed Information Systems, Sep. 28–30, 1994, Austin, Texas.

Shih, et al.; A File–Based Adaptive Prefetch Caching Design; Proceedings, 1990 IEEE International Conference on Computer Design; VLSI in Computers and Processors, Sep. 17–19, 1990, Hyatt Regency Cambridge, Cambridge, MA.

King, et al.; Management of a Remote Backup Copy for Disaster Recovery; ACM Transactions on Database Systems, vol. 16, No. 2, Jun. 1991, pp. 338–368.

U.S. Serial No. 09/149,052, filed Sep. 8, 1998 (Dkt. # TU9–98–014 18.23).

U.S. Serial No. 09/136,630, filed Aug. 19, 1998 (Dkt. #TU9–98–034 18.34).

U.S. Serial No. 09/136,626, filed Aug. 19, 1998 (Dkt. # TU9–98–036 18.37).

* cited by examiner

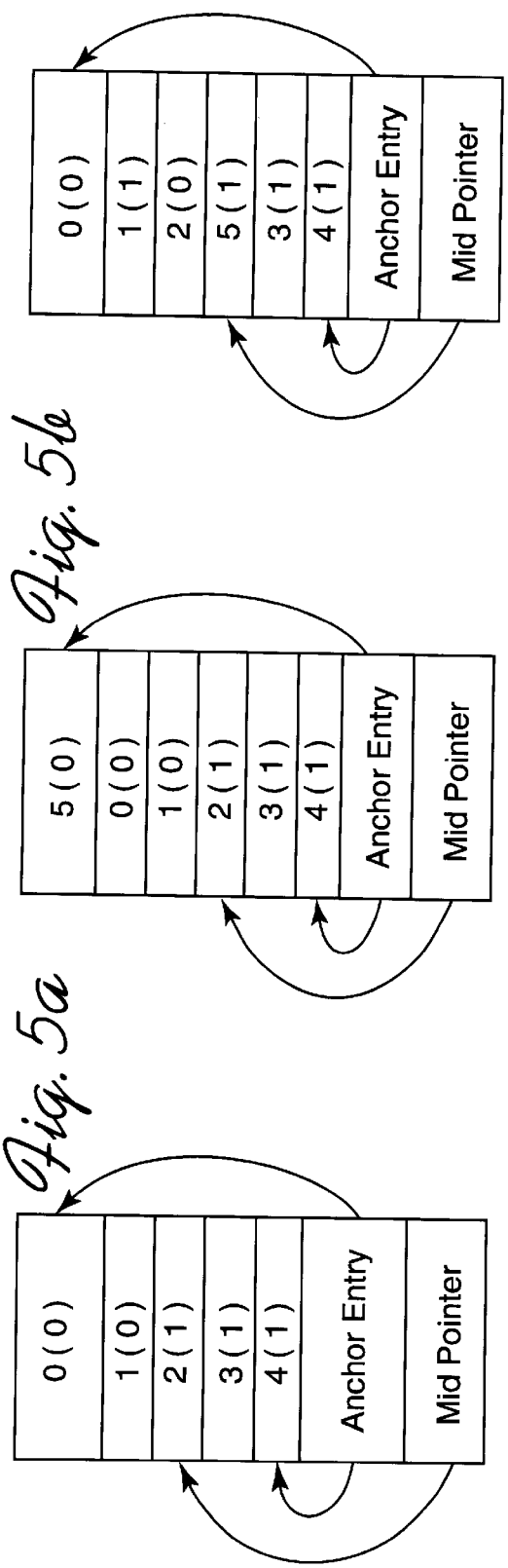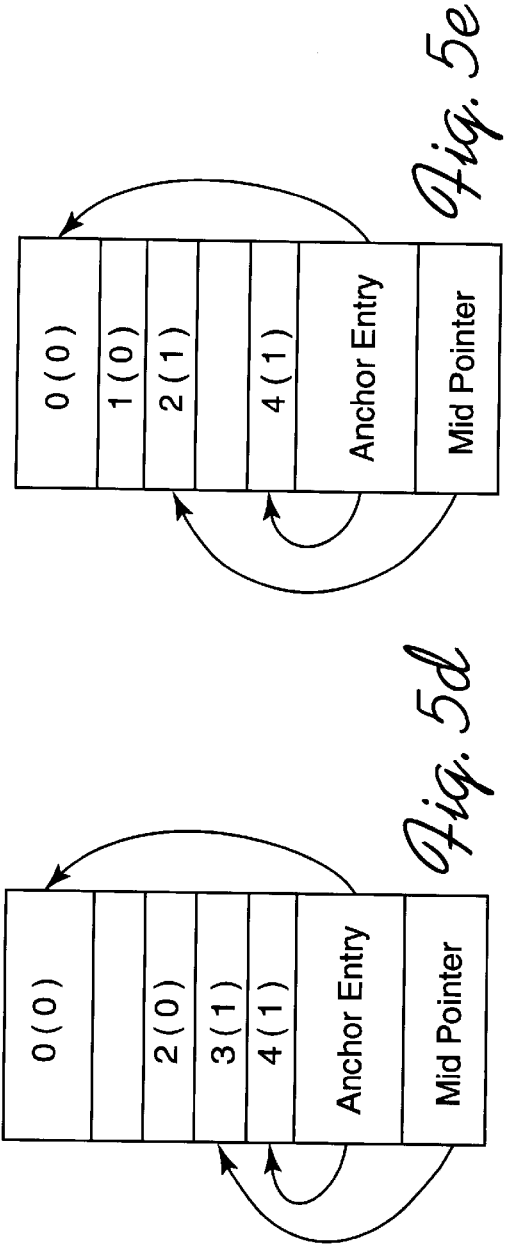

METHOD AND SYSTEM FOR MANAGING DATA IN CACHE

BACKGROUND OF THE INVENTION

1. Field of the Invention

The present invention relates to a method and system for caching data and, in particular, for caching data associated with different access operations, such as sequential and non-sequential data access operations.

2. Description of the Related Art

Data processing systems use a high-speed managed buffer memory, otherwise known as cache, to store frequently used data that is regularly maintained in a relatively slower memory device. For instance, a cache can be a RAM that buffers frequently used data regularly stored in a hard disk drive or a direct access storage device (DASD). After a track is read from the DASD, the track will be cached in RAM and available for subsequent data access requests (DARs). In this way, a storage controller processing read requests can avoid the mechanical delays of having to physically access and read data from the DASD. Cache can also be a high speed memory to a microprocessor to store data and instructions used by the microprocessor that are regularly maintained in RAM. Processor cache would buffer data from a volatile memory device, such as DRAM or RAM.

Often data in cache is managed according to a least recently used (LRU) replacement algorithm in which the least recently used data is demoted from the cache to make room for new data. A first-in-first-out (FIFO) algorithm may also be used. The LRU replacement algorithm works by organizing the data in the cache in a linked list of data entries which is sorted according to the length of time since the most recent reference to each data entry. The most recently used (MRU) data is at one end of the linked list, while the least recently used (LRU) data is at the other. Data that is accessed from the linked list or added for the first time is placed at the MRU end. When data is demoted to accommodate the addition of new data, the demoted data is removed from the LRU end.

Data can be accessed sequentiually or non-sequentially. In the non-sequential access mode, data records are randomly requested. Such non-sequential accesses often occur when an application needs a particular record or data sets. Sequential data access occurs when numerous adjacent tracks are accessed, such as for a data backup operation or to generate a large report. For instance, a disk backup usually creates one long sequential reference to the entire disk, thus, flooding the cache with data. One problem with LRU schemes is that if a sequential data access floods the cache when placed at the MRU end, then other non-sequential records are demoted and removed from cache to accommodate the large sequential data access. Once the non-sequential data is demoted from cache, a data access request (DAR) for the demoted data must be handled by physically accessing the data from the slower memory device.

One goal of cache management algorithms is to maintain reasonable "hit ratios" for a given cache size. A "hit" is a DAR that was returned from cache, whereas a "miss" occurs when the requested data is not in cache and must be retrieved from DASD. A "hit ratio" is empirically determined from the number of hits divided by the total number of DARs, both hits and misses. System performance is often determined by the hit ratio. A system with a low hit ratio may cause delays to application program processing while requested data is retrieved from DASD.

A low hit ratio indicates that the data often was not in cache and had to be retrieved from DASD. Low hit ratios may occur if non-sequentially accessed data is "pushed" out of the cache to make room for a long series of sequentially accessed data. The higher probability of subsequent DARs toward non-sequentially accessed data further lowers the hit ratio because non-sequentially accessed data has a greater likelihood of being accessed. Moreover, the non-sequentially accessed data is "pushed out" of cache to make room for sequentially accessed data that has a lower likelihood of being accessed.

In certain systems, sequential data is placed at the LRU end and non-sequential data at the MRU end. Such methodologies often have the effect of providing an unreasonably low hit ratio for sequentially accessed data because the sequentially accessed data has some probability of being accessed (although usually less than non-sequentially accessed data). Algorithms that place sequentially accessed data at the LRU end cause the sequential data to be demoted very quickly, thus providing a relatively low hit ratio.

SUMMARY OF THE PREFERRED EMBODIMENTS

To overcome the limitations in the prior art described above, preferred embodiments disclose a method for caching data. A list of data entries in a first memory area has a first end and a second end. A first pointer addresses a data entry in the list and a second pointer addresses another data entry in the list that is not at the first and second ends. Data from a second memory area is provided to add to the list. A determination is made as to whether the provided data to add to the list is one of a first type and second type of data. The provided data is stored in the first memory area as a new data entry in the list. The first pointer is modified to address the new data entry after determining that the provided data is of the first type. After determining that the provided data is of the second type, the second pointer is processed to determine where to add the new data entry to the list between the first and second ends.

In further embodiments, the data entries in the list are ordered hierarchically from the first end to the second end. The first pointer addresses a data entry at the first end and the second pointer addresses a data entry in substantially a middle of the list.

In yet further embodiments, the first type of data comprises data associated with a non-sequential data request and the second type of data comprises data associated with a series of sequential data requests.

Preferred embodiments provide a method and system for adding data of one type to one end of an LRU list and data of another type to another location in the list, such as the middle. This provides for a caching scheme that prevents certain data, such as sequentially accessed data, that is accessed in large continuous segments, from overloading cached data of a second type, such as non-sequential data. By caching different data types at different locations in the list, data that tends to dominate cache, such as sequential data, will not push out less frequently accessed data, such as non-sequential data. Preferred embodiments, thus, provide an algorithm to control the placement of data in a cache according to the data access needs of the system.

BRIEF DESCRIPTION OF THE DRAWINGS

Referring now to the drawings in which like reference numbers represent corresponding parts throughout:

FIGS. 5a, b, c, d, e illustrate changes to a linked list in cache having an odd number of entries when data is removed and added in accordance with the logic of FIGS. 3a, b, c, d.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural changes may be made without departing from the scope of the present invention.

Hardware and Software Environment

Figure 1:
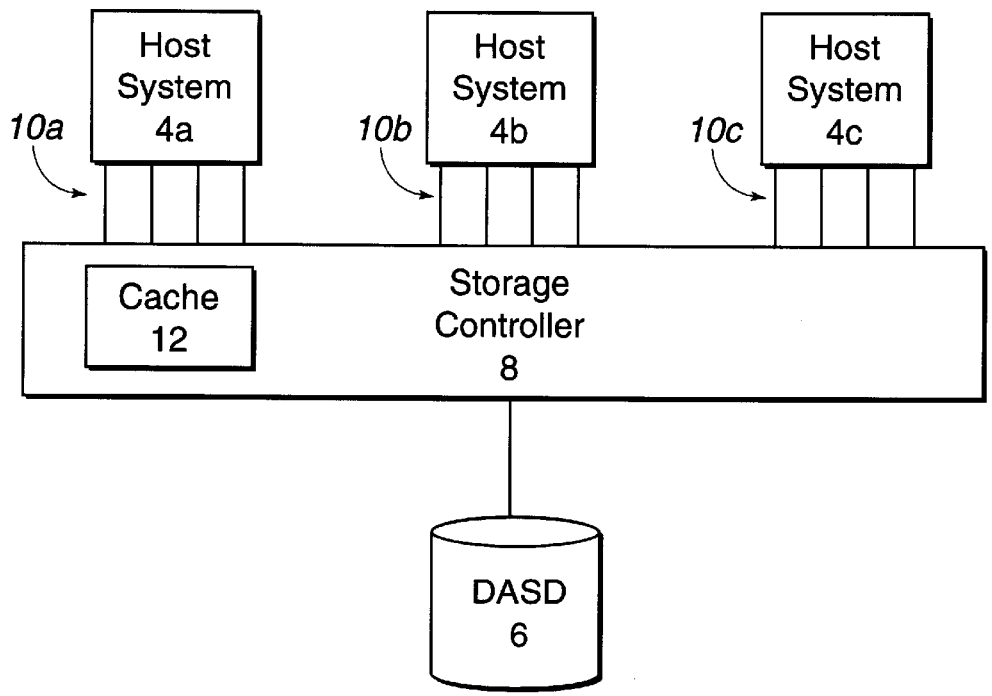
FIG. 1 is a block diagram illustrating a software and hardware environment in which preferred embodiments of the present invention are implemented.

FIG. 1 illustrates a hardware environment in which preferred embodiments are implemented. A plurality of host systems 4a, b, c are in data communication with a DASD 6 via a storage controller 8. The host systems 4a, b, c may be any host system known in the art, such as a mainframe computer, workstations, etc., including an operating system such as WINDOWS®, AIX®, UNIX,® MVS™, etc. AIX is a registered trademark of IBM; MVS is a trademark of IBM; WINDOWS is a registered trademark of Microsoft Corporation; and UNIX is a registered trademark licensed by the X/Open Company LTD. A plurality of channel paths 10a, b, c in the host systems 4a, b, c provide communication paths to the storage controller 8. The storage controller 8 and host systems 4a, b, c may communicate via any network or communication system known in the art, such as LAN, TCP/IP, ESCON®, SAN, SNA, Fibre Channel, SCSI, etc. ESCON is a registered trademark of International Business Machines Corporation ("IBM"). The host system 4a, b, c executes commands and receives returned data along a selected channel 10a, b, c. The storage controller 8 issues commands to physically position the electromechanical devices to read the DASD 6. In preferred embodiments, the structure of the storage controller 8 and interface between the storage controller 8 and host system may include aspects of the storage controller architecture described in the following U.S. patent applications assigned to IBM: "Failover System for a Multiprocessor Storage Controller," by Brent C. Beardsley, Matthew J. Kalos, Ronald R. Knowlden, Ser. No. 09/026,622, filed on Feb. 20, 1998, now U.S. Pat. No. 5,061,750; and "Failover and Failback System for a Direct Access Storage Device," by Brent C. Beardsley and Michael T. Benhase, Ser. No. 08/988,887, filed on Dec. 11, 1997, now U.S. Pat. No. 6,006,342, both of which applications are incorporated herein by reference in their entirety.

The storage controller 8 further includes a cache 12. In alternative embodiments, the cache 12 may be implemented in alternative storage areas accessible to the storage controller 8. In preferred embodiments, the cache 12 is implemented in a high speed, volatile storage area within the storage controller 8, such as a DRAM, RAM, etc. The length of time since the last use of a record in cache is maintained to determine the frequency of use of cache. Data can be transferred between the channels 10a, b, c and the cache 12, between the channels 10a, b, c and the DASD 6, and between the DASD 6 and the cache 12. In alternative embodiments with branching, data retrieved from the DASD 6 in response to a read miss can be concurrently transferred to both the channel 10a, b, c and the cache 12 and a data write can be concurrently transferred from the channel 10a, b, c to both a non-volatile storage unit and cache 12.

To determine whether a DAR is sequentially or non-sequentially accessed, a command may be used to inform the storage controller 8 that a following DAR request is part of a series of sequentially accessed data. For instance, in the IBM mainframe environment, a Define Extent command indicates whether the following I/O operations are part of a sequential access. A description of the Define Extent command is provided in the IBM publication, "IBM 3990/9390 Storage Control Reference," IBM Document no. GA32-0274-04 (Copyright IBM, 1994, 1996), which publication is incorporated herein by reference in its entirety. Alternatively, the storage controller 8 may utilize a predictive buffer memory management scheme to detect whether a sequence of data transfer operations are part of a sequential data access request. Such predictive buffer memory management schemes are described in U.S. Pat. No. 5,623,608, entitled "Method and Apparatus for Adaptive Circular Predictive Buffer Management," assigned to IBM, and which patent is incorporated herein by reference in its entirety. These predictive memory buffer schemes may be used to detect sequential access for SCSI or mainframe type requests when the DARs do not specifically indicate whether the DAR is part of an ongoing sequential access.

The Linked List in Cache

Figure 2:
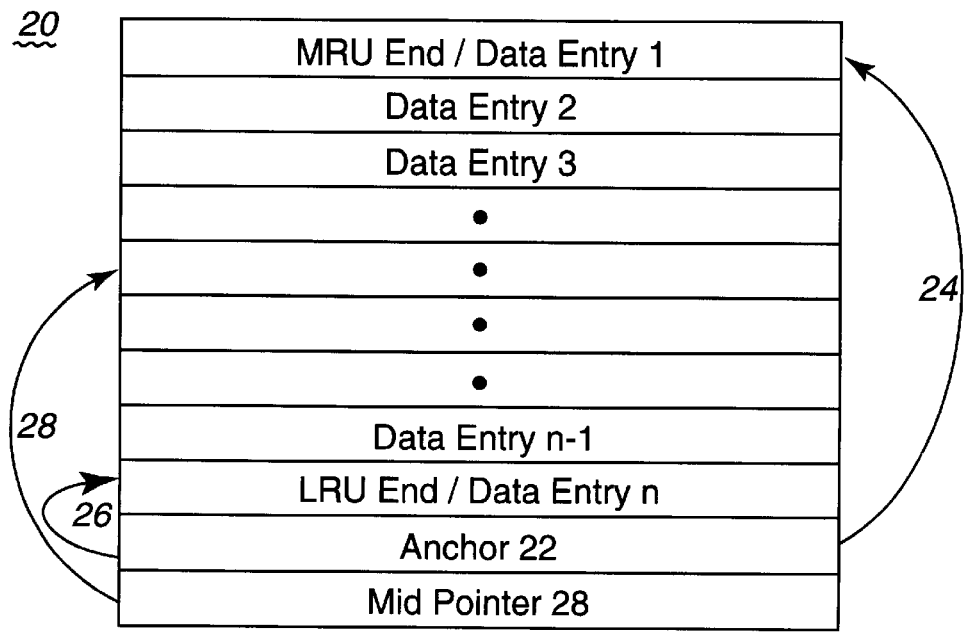
FIG. 2 illustrates a linked list of cache entries in accordance with preferred embodiments of the present invention.

FIG. 2 illustrates a preferred embodiment of a doubly linked list data structure 20 of n data entries in cache 12. The list 20 includes an anchor entry 22 which includes a pointer to the top of the list or most recently used (MRU) end 24 and a pointer to the bottom of the list or the least recently used (LRU) end 26. Each entry in the list includes a pointer to the entry above, i.e., closer to the MRU end 24, referred to herein as an "up pointer" and a pointer to the entry below, i.e., closer to the LRU end 26, referred to herein as a "down pointer." A middle pointer entry 28 includes a pointer to the middle of the list. In preferred embodiments, if the list has an even number of data entries (n), then the middle pointer points to the $(n/2+1)^{th}$ entry. Each data entry includes a lower half flag. If the data entry is at or below the mid pointer 28, then the lower half flag is set "on." Otherwise, if the data entry is above the mid pointer 28, the lower half flag is set "off." In preferred embodiments, data entries at and below the mid pointer 28 are in the lower half. In alternative embodiments, the lower half may exclude the entry at the mid pointer 28.

In preferred embodiments, data that is sequentially accessed is added to the list 20 at the mid pointer 28 and non-sequentially accessed data is added at the MRU end 24. In this way, a long series of sequentially accessed data will not push the non-sequential data off the list 20 because sequentially accessed data is added below the cached non-sequential data. The non-sequential data may still migrate to the lower half of the list 20 as non-sequential data is added to the MRU end 24 and pushes aged non-sequential data to the lower half of the list.

In managing the cache 12, the storage controller 8 may maintain counters indicating the sequential and non-sequential accesses. When the non-sequential counter is zero, sequential accesses may be added to the MRU end 24 of the list 20 after a predetermined number of sequential accesses is reached, the counters may reset to start over. Without the counter, the sequential accesses would only utilize the lower half of the list 20, thereby limiting the duration sequential accesses are available in cache 12. The counters are used to allow sequentially accessed data to utilize the entire list 20 when there are no non-sequential accesses. Thus, in preferred embodiments, availability of the sequentially accessed data is maximized in the absence of recent non-sequential data.

The list 20 may be implemented as a doubly linked list of pointers to the data in cache 12 as shown in FIG. 2. Alternatively, the list 20 may be implemented in control blocks allocated in cache 12, wherein each track or data set has a corresponding control block in the control block section of cache 12. If a track or data set was in the list 20, then the control block for such track would include fields indicating for the entry track the "up pointer", "down pointer," MRU sequence number when the track was added to cache, and any other information maintained for data entries in the list 20. Another control block could maintain the anchor 22 and mid pointer 28 information to access the beginning, end, and middle of the list 20. Embodiments utilizing the control blocks may be used to avoid dynamic memory allocation. In still further embodiments, the list 20 may be comprised of the actual data instead of just pointers to such data.

Cache Management

Figure 3B:
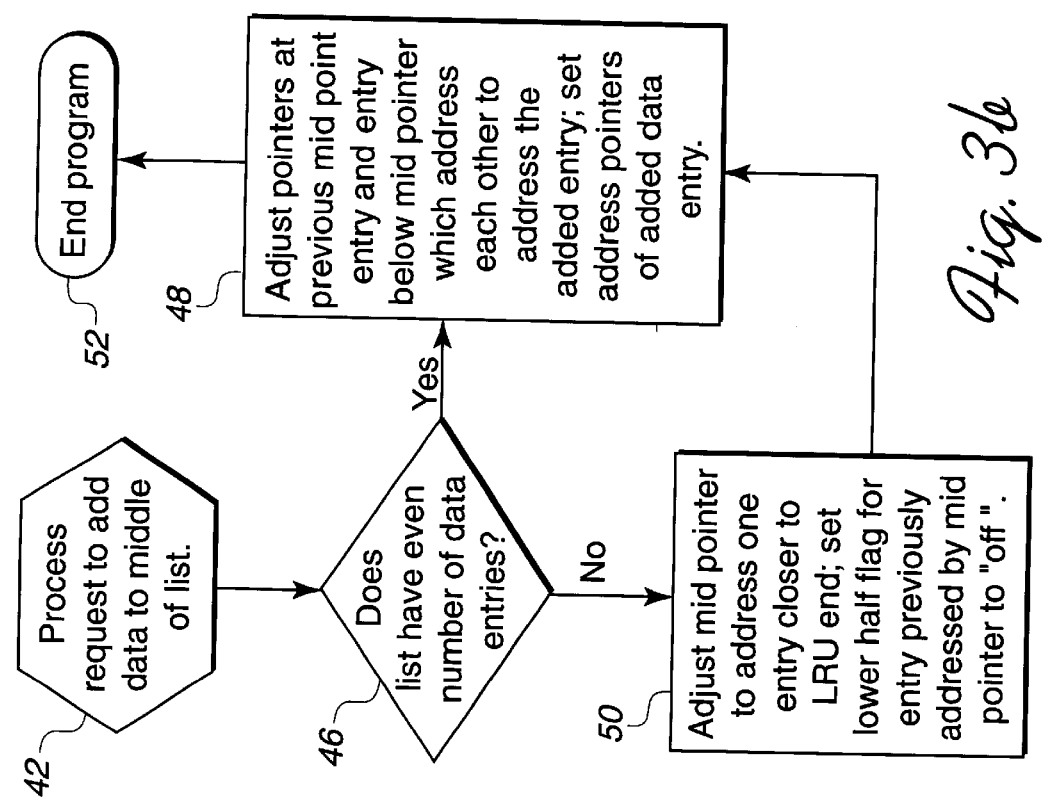
FIGS. 3a, b, c, d illustrate logic to add and remove data entries from the LRU linked list in cache in accordance with preferred embodiments of the present invention.
Figure 3A:
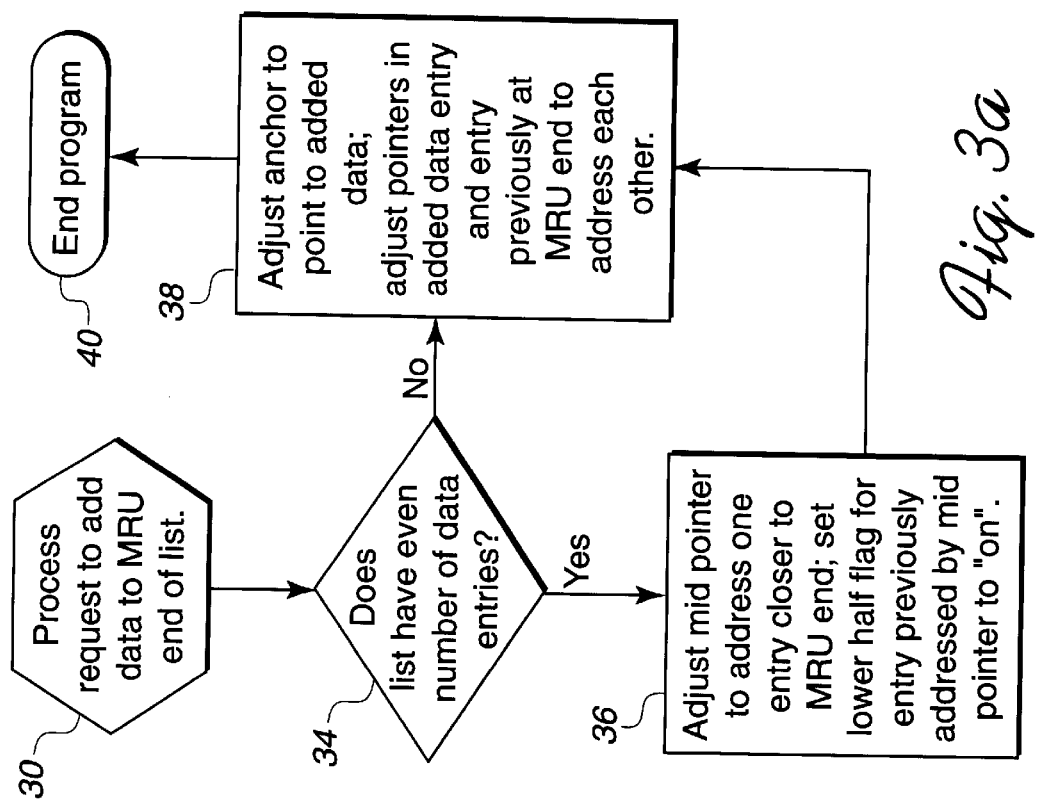

FIGS. 3a, b, c, d illustrate logic implemented in hardware managing the cache 12, such as the storage controller 8 or some other type of processor, to add and remove data from the cache 12 in response to DARs. FIG. 3a illustrates logic executed by the storage controller 8 to add data to the MRU end 24 of the list 20. Control begins at block 30 which represents the storage controller 8 processing a request to add data in cache 12 to the MRU end 24 of the list 20. Control then transfers to block 34 which is a decision block representing the storage controller 8 determining whether the list 20, prior to the addition of the data, has an even number of data entries. If so, control transfers to block 36 which represents the storage controller 8 adjusting the mid pointer 28 to address the entry one entry closer to the MRU end 24 and setting the lower half flag for the data entry addressed by the modified mid pointer to "on." If the list 20 before the data was added has an odd number of data entries, then the mid pointer 28 is not adjusted. From blocks 34 or 36, control transfers to block 38 which represents the storage controller 8 adjusting: (1) the anchor entry 22 MRU end pointer 24 to address the added data entry; (2) the down pointer in the added data entry to address the data entry previously at the MRU end 24; and (3) adjusting the up pointer in the data entry previously at the MRU end 24 to address the added data entry. Control then transfers to block 40 to end the logic.

FIG. 3b illustrates logic the storage controller 8 executes to add data to the middle of the list 20. Control begins at block 42 which represents the storage controller 8 processing a request to add data in cache 12 to the middle of the list 20. Control then transfers to block 46 which represents the storage controller 8 determining whether the list 20 prior to the addition of the data had an even number of entries. If so, control transfers to block 48. Otherwise, control transfers to block 50 which represents the storage controller adjusting the mid pointer 28 to address the added entry below the previous mid pointer 28, and setting the lower half flag for the data entry previously addressed by the mid pointer 28 to "off." From blocks 46 or 50, control transfers to block 48 which represents the storage controller 8 adjusting: (1) the down pointer of the previous middle entry to address the added data entry; (2) the up pointer of the data entry addressed by the down pointer of the middle entry to address the added data entry; and (3) set the up and down pointers of the added data entry to address the adjacent entries.

Because the list 20 is comprised of pointers to data entries in cache 12, data is added, removed or moved up or down in the list 20 by altering the pointers for the list 20.

Figure 3D:
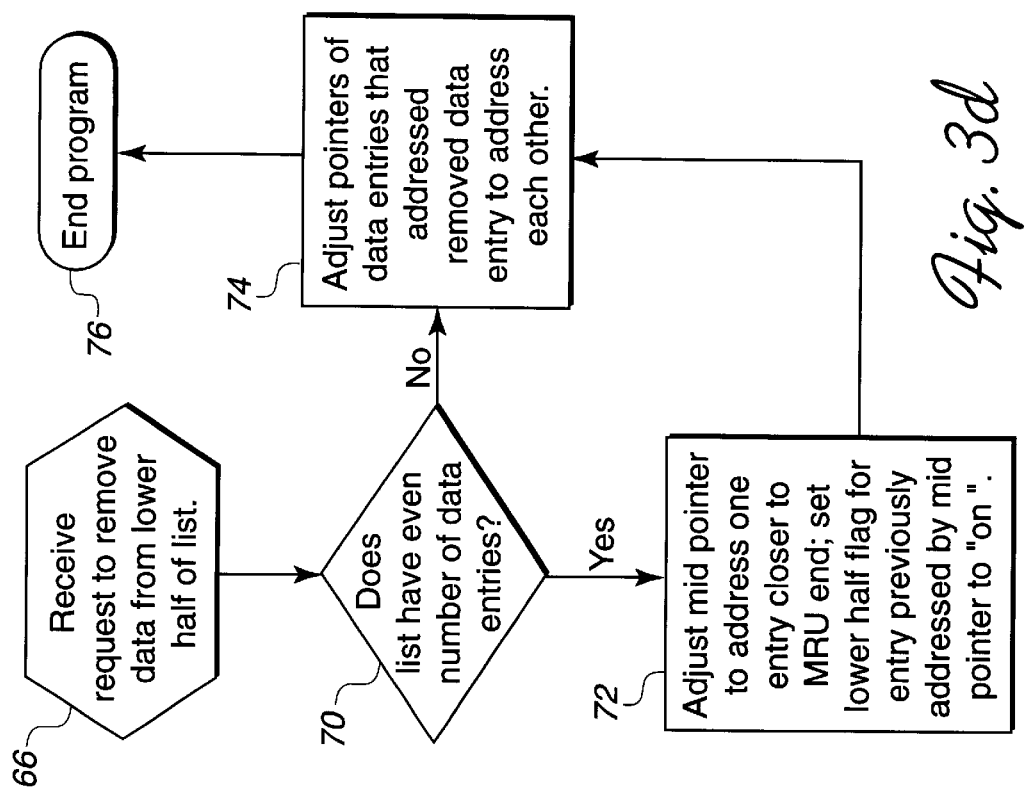
Figure 3C:
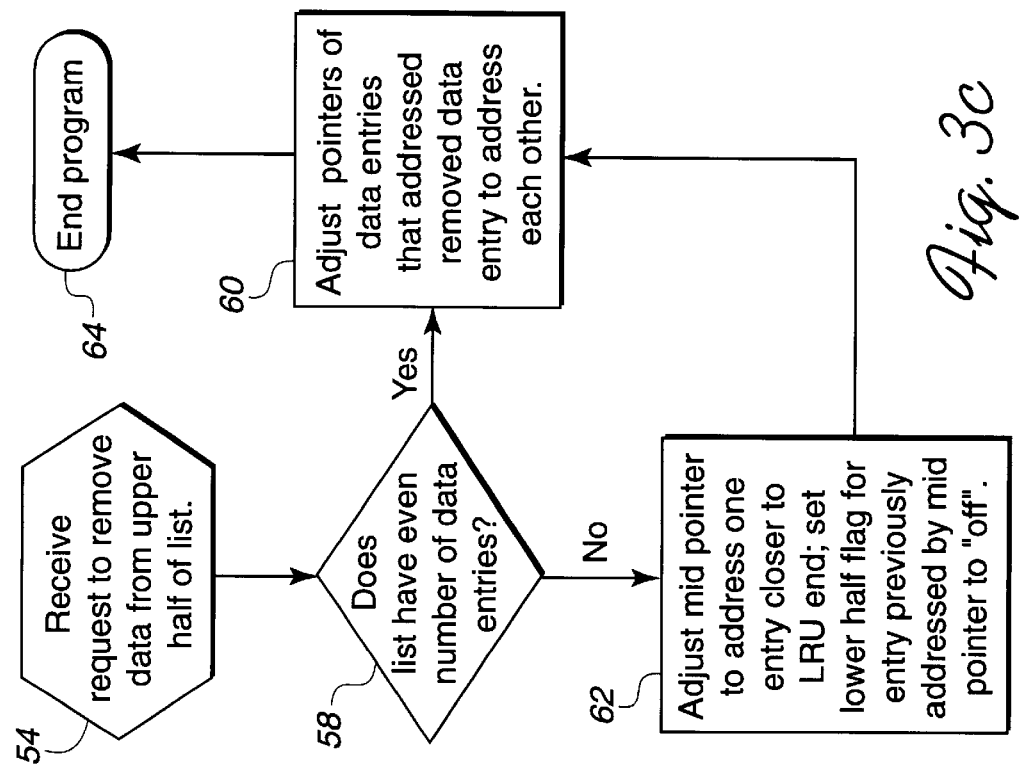

FIG. 3c illustrates logic implemented in the storage controller 8 to remove a data entry from the upper half of the list 20 in the cache 12. The data may be removed as part of a read operation directed toward the cache 12 to obtain data to return to a DAR. Control begins at block 54 which represents the storage controller 8 receiving a request to remove data from the upper half of the list 20. Control transfers to block 58 which represents the storage controller 8 determining whether the list 20, prior to the removal of the data entry, has an even number of data entries. If so, control transfers to block 60; otherwise, control transfers to block 62 to adjust the mid pointer 28 to address the data entry below the data entry previously addressed by the mid pointer 28, i.e., the entry closer to the LRU end 26. The storage controller 8 at block 62 further sets the lower half flag for the previous mid point entry to "off," as that entry is now above the mid pointer 28. From block 58 or 62, control transfers to block 60 which represents the storage controller 8 adjusting the pointers of the data entries that address the data entry to be removed to address each other.

FIG. 3d illustrates logic implemented in the storage controller 8 to remove a data entry located in the lower half of the list 20, at or below the mid pointer 28. Control begins at block 66 which represents the storage controller 8 receiving a request to remove an entry from the lower half of the list 20. Control transfers to block 70 which represents the storage controller 8 determining whether the list 20, prior to the removal of the data entry, has an even number of entries. If so, control transfers to block 72 which represents the storage controller 8 adjusting the mid pointer 28 to address the data entry above the previous mid entry, i.e., the entry closer to the MRU end 26. The storage controller 8 at block 72 would further set the lower half flag for the entry addressed by the modified mid point entry to "on." From block 70 or 72, control transfers to block 74 which represents the storage controller 8 adjusting the pointers of the data entries that address the data entry to be removed to address each other.

In the case where a data entry is removed from both the list 20 and the cache 12 as part of a demotion operation to provide space for new data entries to add to cache 12, then the demoted/removed data entry may be invalidated and overlayed with the new data.

To initialize the list 20, the storage controller 8 may enter a predetermined number of entries in the list 20, set all the pointers and, then, determine the middle entry from scanning the list and setting the mid pointer 28 to the middle entry. Alternatively, the storage controller 8 could add entries and always implement the logic of FIGS. 3a, b, c, d when adding entries, including the first entry.

Figure 4A:
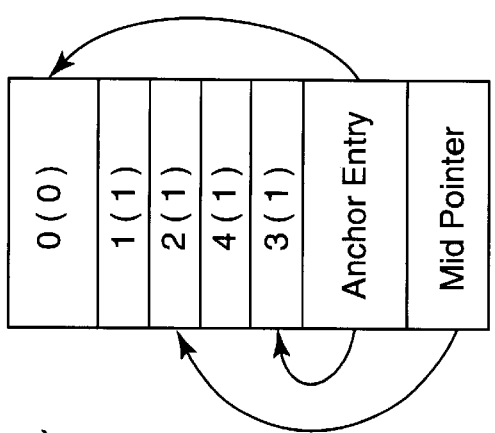
FIGS. 4a, b, c, d, e illustrate changes to a linked list in cache having an even number of entries when data is removed and added in accordance with the logic of FIGS. 3a, b, c, d.
Figure 4B:
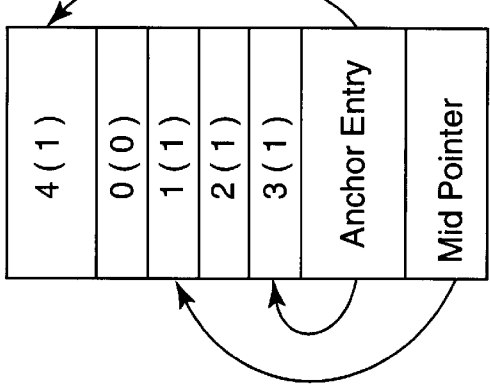
Figure 4C:
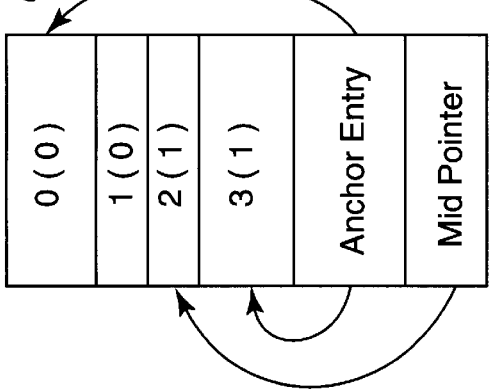

FIGS. 4a, b, c, d, e illustrates how an even member list illustrated in FIG. 4a is modified when data is added and removed. The "1" or "0" in parenthesis indicates whether the lower half flag is "on" or "off". The doubly linked up and down pointers are not shown. FIG. 4b illustrates the addition of data entry 4 to the MRU end 24 of the list 20. The mid pointer 28 is modified to address the data entry 1 above the data entry 2 previously addressed by the mid pointer in FIG. 4a. Further, the lower half flag for the data entry 1 addressed by the modified mid pointer is set "on," as indicated by the "1" in parenthesis. Moreover, the up pointer of the previous MRU end 24 data entry 0 would be modified to address the added data entry 4, and the down pointer of added entry 4 would likewise address data entry 0 below. FIG. 4c illustrates the addition of data entry 4 to the middle of the list. The data entry 4 is added below the previous mid entry 2. In such case, no changes are made to the mid pointer 28. The lower half flag for the added data entry 4 is set "on."

Figure 4D:
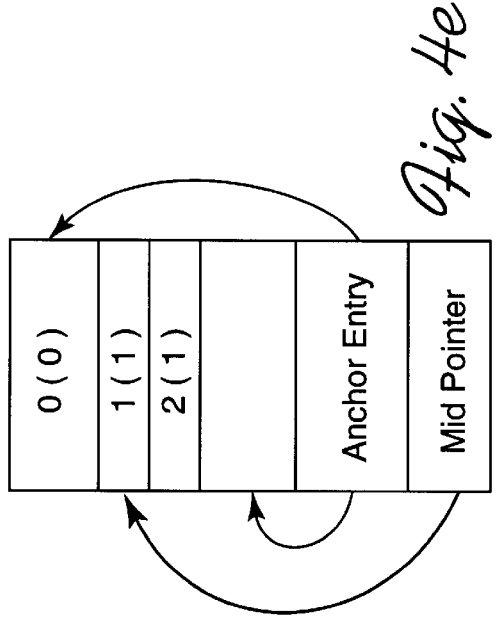
Figure 4E:
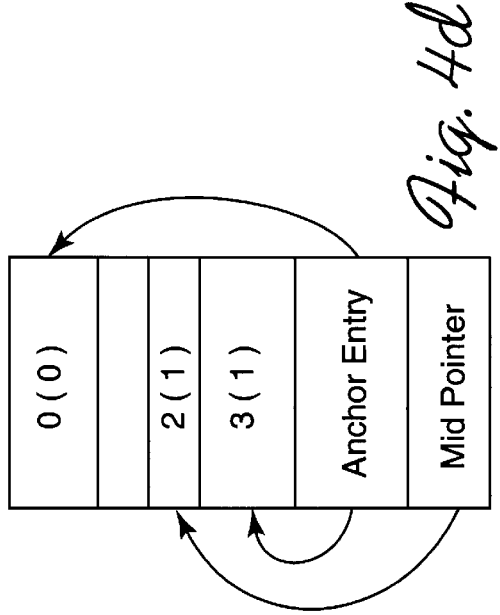

FIG. 4d illustrates the removal of data entry 1 from the upper half of the list. As shown in FIG. 4d, no change is made to the mid pointer 28. However, the pointer from the data entries 2 and 0 would be modified to address each other instead of the removed data entry 1 and the up and down pointers of the removed data entry 1 are set to null. FIG. 4e illustrates the removal of data entry 3 from the lower half of the list 20. The mid pointer 28 is modified to address data entry 1 above the previous mid data entry 2 and the lower half flag of data entry 1 is set to "on." Further, the LRU end pointer 26 of the anchor entry 22 is modified to point to data entry 2 as data entry 3 was removed from the list. Further, the up and down pointers of the removed data 3 entry are set to null.

FIGS. 5a, b, c, d, e illustrate how an odd member list illustrated in FIG. 5a is modified when data is added and removed. The "0" or "1" in parenthesis indicate whether the lower half flag is "on" or "off". The doubly linked up and down pointers are not shown. FIG. 5b illustrates the addition of data entry 5 to the MRU end 24 of the list of FIG. 5a. The mid pointer 28 is unchanged. However, the added data entry 5 would include a pointer to the previous top data entry 0, and the up pointer of data entry 0 and the anchor MRU pointer 24 would be modified to point to data entry 5. FIG. 5c illustrates the addition of data entry 5 to the middle of the list, below the previous middle entry 2. The middle pointer must be modified to point to data entry 5 and the lower half flag of the previous mid entry 2 is turned "off" because data entry 2 is now in the upper half of the list. The lower half flag of data entry 5 is turned "on." Further, the pointers of data entries 2 and 3 that pointed to each other are modified to address data entry 5 and the up and down pointers of data entry 5 are set to address data entries 2 and 3, respectively.

FIG. 5d illustrates the removal of data entry 1 from the upper half of the list. The mid pointer 28 is adjusted downward toward the LRU end 26 of the list to point to data entry 3 and the lower half flag for data entry 2 is set to "off" as data entry 2 is now in the upper half. Further, the pointers of data entries 0 and 2 that previously addressed data entry 1 are modified to address each other. Further, the up and down pointers of the removed data entry 1 are set to null. FIG. 5e illustrates the removal of data entry 3 from the lower half of the list. The mid pointer 28 remains unmodified. However, the pointers of data entries 2 and 4 that previously addressed data entry 3 are modified to address each other. Further, the up and down pointers of the removed data entry 3 are set to null.

Figure 6:
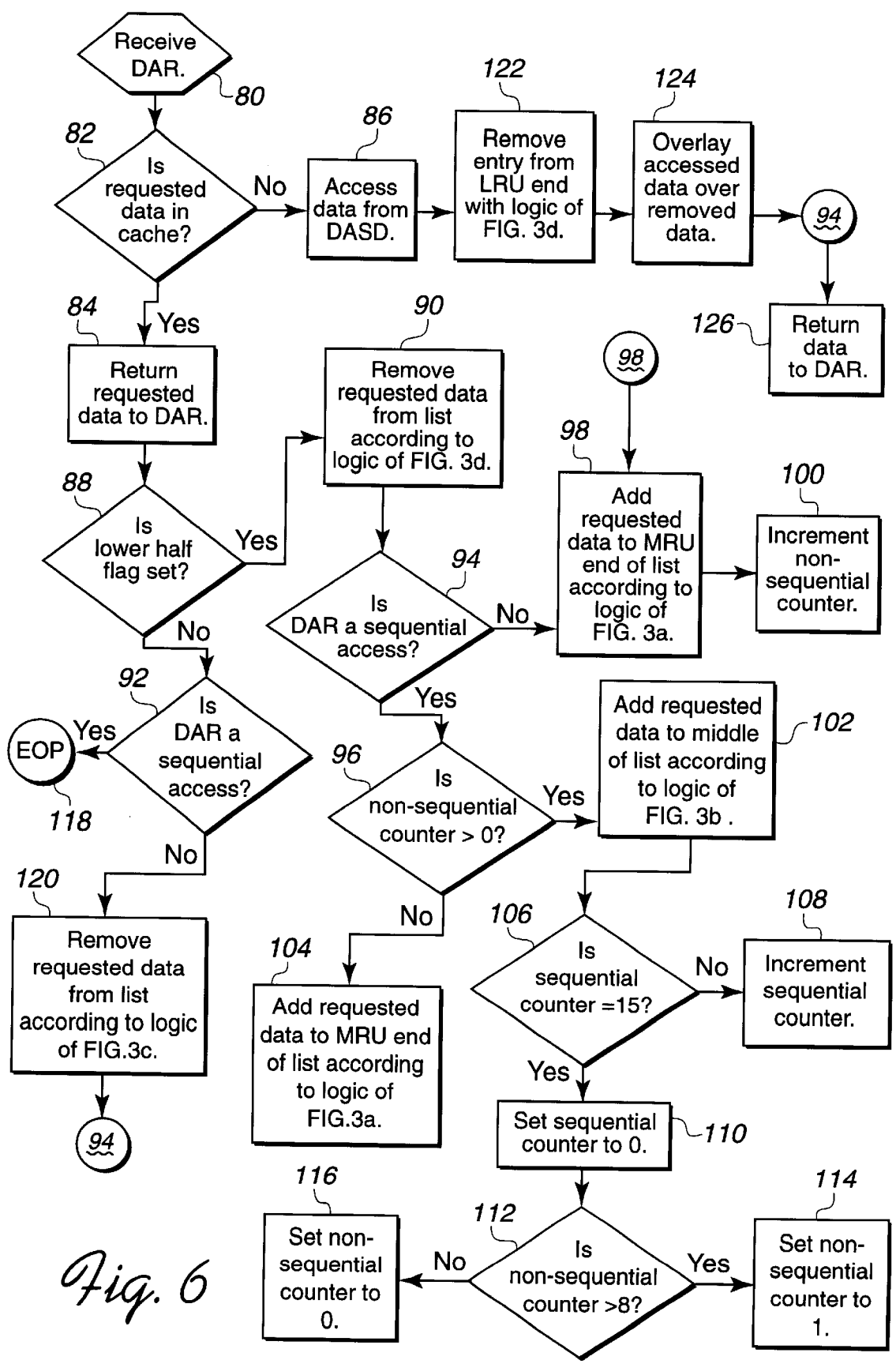
FIG. 6 illustrates preferred logic to handle a DAR and manage data in cache in accordance with preferred embodiments of the present invention.

FIG. 6 illustrates logic executed by the storage controller 8 to manage data in the cache 12. Control begins at block 80 which represents the storage controller 8 receiving a data access request (DAR). Control transfers to block 82 which represents the storage controller 8 determining whether the requested data is in cache 12. If so, control transfers to block 84; otherwise control transfers to block 86. If the data is in cache 12, then at block 84 the storage controller 8 returns the requested data from cache 12 to a requestor, which may be an application program or other requesting device. From block 84, control transfers to block 88 which represents the storage controller 8 determining whether the lower half flag is "on," i.e., the requested data is at or below the mid pointer 28. If the flag is "on," i.e., in the lower half of the list 20, then control transfers to block 90 which represents the storage controller 8 removing the data from the list 20 according to the logic of FIG. 3d. Data in cache 12 removed from the list 20 remains in cache 12 until overlayed with new data. Otherwise, if the data is in the upper half of the list, i.e., the lower half flag is "off," then control transfers to block 92.

After removing data in the lower half of the list at block 90, control transfers to block 94 which represents the storage controller 8 determining whether the DAR which caused the removal of the data from the list is a sequential access. As discussed, a command provided with the DAR, such as the Define Extent command used with the IBM 3990 Storage Controller, may indicate that the DAR is a sequential access or the storage controller 8 may use a predictive algorithm to determine whether the data is sequentially accessed. If the DAR is a sequential access, then control transfers to block 96; otherwise, control transfers to block 98. If the DAR is non-sequential, then at block 98, the storage controller 8 adds the requested data previously removed from the list 20 to the MRU end 24 of the list 20 according to the logic of FIG. 3a. Control then transfers to block 100 which represents the storage controller 8 incrementing a non-sequential counter.

If the DAR was a sequential access, then control transfers to block 96 which represents the storage controller 8 determining whether the non-sequential counter is greater than zero. If so, then control transfers to block 102 which represents the addition of the requested data accessed sequentially to the middle of the list according to the logic of FIG. 3b. Otherwise, if the non-sequential counter is equal to zero, then at block 104, the previously accessed sequential data is added to the MRU end 24 to allow sequentially accessed data to utilize the entire list in the absence of non-sequentially accessed data. From block 102, after adding the requested data previously removed to the middle of the list 20, control transfers to block 106 which represents the storage controller 8 determining whether the sequential counter is a predetermined value, e.g., 15. If no, control transfers to block 108 to increment the sequential counter. If the sequential counter is one away from a predetermined threshold value, e.g., 16, then control transfers to block 110 which represents the storage controller 8 resetting the sequential counter to zero.

Control transfers to block 112 where the storage controller 8 determines whether the non-sequential counter is greater than a predetermined threshold, e.g., 8. If so, then control transfers to block 114 which represents the storage controller 8 setting the non-sequential counter to one. Otherwise, control transfers to block 116 to set the non-sequent;al counter to 0. In this way, if the non-sequential counter has a sufficient number of values indicating a significant level of non-sequential access, then the non-sequential counter is set to one or some other value so the next sequential access will not utilize the upper half of the list. In preferred embodiments, the predetermined values which cause the storage controller 8 to reset the counters and perform certain actions may be determined empirically by performing test runs under different scenarios with different cache, storage controller, host, and DASD systems to select optimal predetermined values.

If at block 88, the storage controller 8 had determined that the lower half flag is not set, i.e., the requested data is in the upper half of the list 20, then control transfers to block 92 which represents the storage controller 8 determining whether the DAR is a sequential access. It the DAR is a sequential access and in the upper half of the list, then control transfers to block 118 which represents the end of the program (EOP). Thus, data placed in the upper half of the list as a non-sequential or sequential access is not moved to the lower half as a result of a subsequent sequential access. Instead, the data remains in the upper half. Otherwise, if the DAR is non-sequentially accessed data and in the upper half of the list 20, then control transfers to block 120 which represents the storage controller 8 removing the requested data from the list according to the logic of FIG. 3c. Control then transfers to block 98 et seq. to add the requested data to the MRU end 24 of the list 20.

Thus, with the logic of FIG. 6, sequentially accessed data remains in the list 20 and cache 12 for a longer period of time than non-sequentially accessed data to improve the hit ratio as non-sequentially accessed data has a greater likelihood of being accessed than sequentially accessed data.

If the storage controller 8 determined that the requested data was not in the cache 12 at block 82, then control transfers to block 86 which represents the storage controller 8 accessing the requested data from DASD 6. At block 122, the storage controller 8 removes the data entry from the LRU end 26 of the list 20 with the logic of FIG. 3d. Control transfers to block 124 which represents the storage controller 8 overlaying the accessed data over the space in cache 12 that contained the data entry removed from the list 20 at block 122. Note, that blocks 122 and 124 assume that the cache 12 is always full, i.e., at initialization all entries in the list 20 were filled. In embodiments where the cache 12 is not full at all times, data accessed from DASD 6 may be added to the cache 12 and list 20 without removing and overlaying the LRU data entry 26 in the list at blocks 122 and 124. Control then proceeds to blocks 94 et seq. to determine how to modify the list 20 to accommodate the data added to cache 12 at block 124. After adding the overlayed data to the appropriate position in the list 20, control transfers to block 126 to return the data added to cache 12 to the reqeustor.

Alternative Embodiments and Conclusion

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to the IBM mainframe environment, where a storage controller unit interfaces numerous host systems with a DASD. However, those skilled in the art will appreciate that the preferred caching algorithms could apply to any data transfer protocol, including SCSI. For instance, in SCSI, a sector count is transferred to the storage controller which provides a range of sectors, i.e., fixed blocks, the read operation will operate upon. In such case, the intent count would be set to the sector count. The preferred embodiments may be utilized with any hard disk configuration known in the art, including interfaces such as ST-506/ST-412, IDE/ATA, Enhanced Small Device Interface (ESDI), floppy disk, parallel port, ATA, EIDE, ATA-2, Fast ATA, Ultra ATA, etc.

The logic of FIGS. 3a, b, c, d and 6 may be implemented in microcode or as part of an application program the storage controller 8 executes. Still further, the logic of FIGS. 3a, b, c, d and 6 may be implemented as hardwired circuitry that is dedicated to managing the cache 12. Alternatively, certain of the logic of FIGS. 3a, b, c, d and 4 may be performed by the host system 4a, b, c. The logic of FIGS. 3a, b, c, d and 4 is for illustrative purposes. Certain steps may be modified or removed altogether and other steps added. Further, the order of the steps performed may also vary from the described embodiments.

In preferred embodiments, the data maintained in cache may be any data set or format, including fixed block CKD track, record, stripe, etc. Moreover, preferred embodiments were described as removing and adding data to cache 12 in response to DARs. In alternative embodiments, the logic managing the cache may add and remove data as part of data management operations unrelated to specific DARs.

Preferred embodiments were described as adding sequentially accessed data to the middle of the list. However, in alternative embodiments, sequentially accessed data could be added to any location between the first and second ends to optimize hit ratios. Moreover, in preferred embodiments, the list ordered sequentially and non-sequentially accessed data. However, those skilled in the art will appreciate that the list of the present invention could be used to order any types of data where one data is to be placed at a higher ordering in the list and the other type of data at a lower ordering.

Preferred embodiments were described with respect to managing a cache that buffers data from a DASD. The logic of the preferred embodiments could be used to manage cache that buffers data from any type of memory device, non-volatile as well as volatile, to another cache memory, which may be of a higher speed. For instance, data from a DRAM or RAM can be buffered in a higher speed cache, such as a cache that is on-board a microprocessor, e.g., the L2 cache used with the PENTIUM® II microprocessor. PENTIUM II is a registered trademark of Intel Corporation.

In summary, preferred embodiments disclose a method for caching data. A list of data entries in a first memory area has a first end and a second end. A first pointer addresses a data entry in the list and a second pointer addresses another data entry in the list that is not at the first and second ends. Data from a second memory area is provided to add to the list. A determination is made as to whether the provided data to add to the list is one of a first type and second type of data. The provided data is stored in the first memory area as a new data entry in the list. The first pointer is modified to address the new data entry after determining that the provided data is of the first type. After determining that the provided data is of the second type, the second pointer is processed to determine where to add the new data entry to the list between the first and second ends.

The foregoing description of the preferred embodiments of the invention has been presented for the purposes of illustration and description. It is not intended to be exhaustive or to limit the invention to the precise form disclosed.

Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for caching data, comprising:

providing a list of data entries in a first memory area, wherein the list has a first end and a second end, wherein a first pointer addresses a data entry in the list, and wherein a second pointer addresses another data entry in the list that is not at the first and second ends, wherein the data entries in the list are ordered hierarchically from the first end to the second end, wherein the first pointer addresses a data entry at the first end, and wherein the second pointer addresses a data entry in substantially a middle of the list of data entries;

providing data from a second memory area to add to the list;

determining whether the provided data to add to the list is one of a first type and second type of data;

storing the provided data in the first memory area as a new data entry in the list;

modifying the first pointer to address the new data entry after determining that the provided data is of the first type;

after modifying the first pointer to address the new data entry, determining whether the list has an even number of data entries and modifying the second pointer to address a data entry ordered closer to the first end after determining that the list has the even number of entries; and processing the second pointer to determine where to add the new data entry to the list between the first and second ends after determining that the provided data is of the second type.

2. A method for caching data, comprising:

providing a list of data entries in a first memory area, wherein the list has a first end and a second end, wherein a first pointer addresses a data entry in the list, and wherein a second pointer addresses another data entry in the list that is not at the first and second ends, wherein the data entries in the list ordered hierarchically from the first end to the second end, wherein the first pointer addresses a data entry at the first end, and wherein the second pointer addresses a data entry in substantially a middle of the list of data entries;

providing data from a second memory area to add to the list;

determining whether the provided data to add to the list is one of a first type and second type of data;

storing the provided data in the first memory area as a new data entry in the list;

modifying the first pointer to address the new data entry after determining that the provided data is of the first type;

processing the second pointer to determine where to add the new data entry to the list between the first and second ends after determining that the provided data is of the second type; and after processing the second pointer to determine where to add the new data entry to the list, determining whether the list has an even number of data entries and modifying the second pointer to address a data entry ordered closer to the second end after determining that the list does not have the even number of entries.

3. A method for caching data, comprising:

providing a list of data entries in a first memory area, wherein the list has a first end and a second end, wherein a first pointer addresses a data entry in the list, and wherein a second pointer addresses another data entry in the list that is not at the first and second ends;

providing data from a second memory area to add to the list;

determining whether the provided data to add to the list is associated with a non-sequential data access request or a sequential data access request;

incrementing a counter when the provided data is associated with the non-sequential data access request;

storing the provided data in the first memory area as a new data entry in the list;

modifying the first pointer to adress the new data entry after determining that the provided data is associated with the non-sequential data access request;

processing the second pointer to determine where to add the new data entry to the list between the first and second ends after determinig that the provided data is associated with the sequential acess request after determining that the counter is greater than or equal to a value; and modifying the first pointer to address the new data entry when the provided data is associated with the sequential data access request after determining that the counter is less than equal to the value. is less than or equal to the value.

4. The method of claim 3, wherein the counter is a first counter and the value is a first value, further comprising:

incrementing a second counter when the provided data is associated with the sequential data access request; and resetting the first and second counters after determining that the second counter is equal to a second value.

5. A system for caching data, comprising:

a processing unit;

a first memory area accessible to the processing unit;

a second memory area, wherein the processing unit is capable of communicating data between the first and second memory areas;

program logic executed by the processing unit, comprising:

(i) means for accessing a list of data entries in the first memory area, wherein the list has a first end and a second end, wherein a first pointer addresses a data entry in the list, and wherein a second pointer addresses another data entry in the list that is not at the first and second ends, wherein the data entries in the list are ordered hierarchically from the first end to the second end, wherein the first pointer addresses a data entry at the first end, and wherein the second pointer addresses a data entry in substantially a middle of the list;

(ii) means for receiving data from the second memory area to add to the list;

(iii) means for determining whether the data to add to the list is one of a first type and second type of data;

(iv) means for storing the data to add in the first memory area as a new data entry in the list;

(v) means for modifying the first pointer to address the new data entry to the list between the first and second ends after determining that the provided data is of the first type;

(vi) means for determining whether the list has an even number of data entries and modifying the second pointer to address a data entry ordered closer to the first end after determining that the list has the even number of entries and after the first pointer is modified to address the new data entry; and (vii) means for processing the second pointer to determine where to add the new data entry to the list after determining that the data to add is of the second type.

6. A system for caching data, comprising:

a processing unit;

a first memory area accessible to the processing unit;

a second memory area, wherein the processing unit is capable of communicating data between the first and second memory areas;

program logic executed by the processing unit, comprising:

(i) means for accessing a list of data entries in the first memory area, wherein the list has a first end and a second end, wherein a first pointer addresses a data entry in the list, and wherein a second pointer addresses another data entry in the list that is not at the first and second ends, wherein the data entries in the list are ordered hierarchically from the first end to the second end, wherein the first pointer addresses a data entry at the first end, and wherein the second pointer addresses a data entry in substantially a middle of the list;

(ii) means for receiving data from the second memory area to add to the list;

(iii) means for determining whether the data to add to the list is one of a first type and second type of data;

(iv) means for storing the data to add in the first memory area as a new data entry in the list;

(v) means for modifying the first pointer to address the new data entry to the list between the first and second ends after determining that the provided data is of the first type;

(vi) means for processing the second pointer to determine where to add the new data entry to the list after determining that the data to add is of the second type; and (viii) means for determining whether the list has an even number of data entries and means for modifying the second pointer to address a data entry ordered closer to the second end after determining that the list does not have the even number of entries.

7. An article of manufacture for use in programming a processing unit to cache data in a first memory area from a second memory area, the article of manufacture comprising at least one computer readable storage device including at least one computer program embedded therein that causes the processing unit to perform:

providing a list of data entries in a first memory area, wherein the list has a first end and a second end, wherein a first pointer addresses a data entry in the list, and wherein a second pointer addresses another data entry in the list that is not at the first and second ends, wherein the data entries in the list are ordered hierarchically from the first end to the second end, wherein the first pointer addresses a data entry at the first end, and wherein the second pointer addresses a data entry in substantially a middle of the list;

providing data from a second memory area to add to the list;

determining whether the provided data to add to the list is one of a first type and second type of data;

storing the provided data in the first memory area as a new data entry in the list;

modifying the first pointer to address the new data entry after determining that the provided data is of the first type;

after modifying the first pointer to address the new data entry, determining whether the list has an even number of data entries and modifying the second pointer to address a data entry ordered closer to the first end after determining that the list has the even number of entries; and processing the second pointer to determine where to add the new data entry to the list between the first and second ends after determining that the provided data is of the second type.

8. An article of manufacture for use in programming a processing unit to cache data in a first memory area from a second memory area, the article of manufacture comprising at least one computer readable storage device including at least one computer program embedded therein that causes the processing unit to perform:

providing a list of data entries in a first memory area, wherein the list has a first end and a second end, wherein a first pointer addresses a data entry in the list, and wherein a second pointer addresses another data entry in the list that is not at the first and second ends, wherein the data entries in the list are ordered hierarchically from the first end to the second end, wherein the first pointer addresses a data entry at the first end, and wherein the second pointer addresses a data entry in substantially a middle of the list;

providing data from a second memory area to add to the list;

determining whether the provided data to add to the list is one of a first type and second type of data;

storing the provided data in the first memory area as a new data entry in the list;

modifying the first pointer to address the new data entry after determining that the provided data is of the first type;

processing the second pointer to determine where to add the new data entry to the list between the first and second ends after determining that the provided data is of the second type; and after processing the second pointer to determine where to add the new data entry to the list, determining whether the list has an even number of data entries and modifying the second pointer to address a data entry ordered closer to the second end after determining that the list does not have the even number of entries.

9. An article of manufacture for use in programming a processing unit to cache data in a first memory area from a second memory area, the article of manufacture comprising at least one computer readable storage device including at least one computer program embedded therein that causes the processing unit to perform:

providing a list of data entries in a first memory area, wherein the list has a first end and a second end, wherein a first pointer addresses a data entry in the list, and wherein a second pointer addresses another data entry in the list that is not at the first and second ends;

providing data from a second memory area to add to the list;

determining whether the provided data to add to the list is associated with a non-sequential data access request or a sequential data access request;

incrementing a counter when the provided data is associated with the non-sequential data access request;

storing the provided data in the first memory area as a new data entry in the list;

modifying the first pointer to address the new data entry after determining that the provided data is associated with the non-sequential data access request;

processing the second pointer to determine where to add the new data entry to the list between the first and second ends after determining that the provided data is associated with the sequential access request after determining that the counter is greater than or equal to a value; and modifying the first pointer to address the new data entry when the provided data is associated with the sequential data access request after determining that the counter is less than or equal to the value.

10. The article of manufacture of claim 9, wherein the counter is a first counter and the value is a first value, further comprising:

incrementing a second counter when the provided data is associated with the second sequential access request; and resetting the first and second counters after determining that the second counter is equal to a second value.

11. A first memory area storing a list data structure accessible to a processing unit, wherein the list data structure provides a plurality of data entries copied from a second memory area, wherein the processing unit processes the list data structure to manage the storage of data in the first memory area, the list data structure comprising:

a list of data entries having a first end and a second end, wherein the data entries in the list are ordered hierarchically from the first end to the second end, wherein the first pointer addresses a data entry at the first end, and wherein the second pointer addresses a data entry in substantially a middle of the list;

a first pointer addressing a data entry in the list; and a second pointer addressing another data entry in the list that is not at the first and second ends, wherein the processing unit stores data in the first memory area as a new data entry in the list and determines whether new data entry to add to the list is one of a first type and second type of data, wherein the processing unit modifies the first pointer to address the new data entry after determining that the provided data is of the first type, wherein the processing unit processes the second pointer to determine where to add the new data entry to the list between the first and second ends after determining that the provided data is of the second type; and wherein the processing unit modifies the first pointer to address the new data entry by determining whether the list has an even number of data entries and modifying the second pointer to address a data entry ordered closer to the first end after determining that the list has the even number of entries.

12. A first memory area storing a list data structure accessible to a processing unit, wherein the list data structure provides a plurality of data entries copied from a second memory area, wherein the processing unit processes the list data structure to manage the storage of data in the first memory area, the list data structure comprising:

a list of data entries having a first end and a second end, wherein the data entries in the list are ordered hierarchically from the first end to the second end, wherein the first pointer addresses a data entry at the first end, and wherein the second pointer addresses a data entry in substantially a middle of the list;

a first pointer addressing a data entry in the list; and a second pointer addressing another data entry in the list that is not at the first and second ends, wherein the processing unit stores data in the first memory area as a new data entry in the list and determines whether new data entry to add to the list is one of a first type and second type of data, wherein the processing unit modifies the first pointer to address the new data entry after determining that the provided data is of the first type, wherein the processing unit processes the second pointer to determine where to add the new data entry to the list between the first and second ends after determining that the provided data is of the second type; and wherein the processing unit processes the second pointer to determine where to add the new data entry to the list by determining whether the list has an even number of data entries and modifying the second pointer to address a data entry ordered closer to the second end after determining that the list does not have the even number of entries.

13. A first memory area storing a list data structure accessible to a processing unit, wherein the list data structure provides a plurality of data entries copied from a second memory area, wherein the processing unit processes the list data structure to manage the storage of data in the first memory area, the list data structure comprising:

a list of data entries having a first end and a second end;

a first pointer addressing a data entry in the list; and a second pointer addressing another data entry in the list that is not at the first and second ends, wherein the processing unit stores data in the first memory area as a new data entry in the list and determines whether new data entry to add to the list is one of a first type and second type of data, wherein the processing unit modifies the first pointer to address the new data entry after determining that the provided data is of the first type, and wherein the processing unit processes the second pointer to determine where to add the new data entry to the list between the first and second ends after determining that the provided data is of the second type;

a counter, wherein the processing unit increments the counter when the provided data is of the first type, wherein the processing unit processes the second pointer when the provided data is of the second type after determining that the counter is greater than or equal to a value, and wherein the processing unit modifies the first pointer to address the new data entry when the provided data is of the second type after determining that the counter is less than or equal to the value; and wherein the first type of data comprises data associated with a non-sequential data request and the second type of data comprises data associated with a series of sequential data requests.

14. The memory area of claim 13, wherein the counter is a first counter and the value is a first value, wherein the memory area further comprises a second counter, wherein the processing unit increments the second counter when the provided data is of the second type, and wherein the processing unit resets the first and second counters after determining that the second counter is equal to a second value.

* * * * *